US012786905B2

(12) United States Patent
Liu

(10) Patent No.: US 12,786,905 B2
(45) Date of Patent: Nov. 3, 2026

(54) AVAILABILITY CONFIGURATION METHOD AND APPARATUS FOR A USER EQUIPMENT IN A NON-CONNECTED STATE

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 249 days.

(21) Appl. No.: 18/567,201

(22) PCT Filed: Jun. 16, 2021

(86) PCT No.: PCT/CN2021/100426
§ 371 (c)(1),
(2) Date: Dec. 5, 2023

(87) PCT Pub. No.: WO2022/261869
PCT Pub. Date: Dec. 22, 2022

(65) Prior Publication Data
US 2024/0284354 A1 Aug. 22, 2024

(51) Int. Cl.
*H04W 56/00* (2009.01)
*H04L 5/00* (2006.01)
*H04W 72/232* (2023.01)

(52) U.S. Cl.
CPC ......... *H04W 56/001* (2013.01); *H04L 5/0053* (2013.01); *H04W 72/232* (2023.01)

(58) Field of Classification Search
CPC ............. H04W 56/001; H04W 72/232; H04W 52/0225; H04W 56/0015; H04W 68/025;
(Continued)

(56) References Cited

U.S. PATENT DOCUMENTS

2019/0215712 A1 7/2019 Babaei et al.
2020/0245113 A1* 7/2020 Kang .................... H04W 76/27
(Continued)

FOREIGN PATENT DOCUMENTS

CN 105578599 A 5/2016
CN 112753267 A 5/2021
(Continued)

OTHER PUBLICATIONS

Notice of Reasons for Refusal issued by the Japanese Patent Office on Dec. 13, 2024, in corresponding Application No. JP 2023-577803, 10 pages.
(Continued)

*Primary Examiner* — Kiet Tang
(74) *Attorney, Agent, or Firm* — Finnegan, Henderson, Farabow, Garrett & Dunner, L.L.P.

(57) ABSTRACT

An information transmission method is performed by an access network device, and includes: sending an availability configuration, wherein the availability configuration is configured to be used by a user equipment (UE) in a non-connected state for determining a reference signal configuration for downlink synchronization; wherein the UE in the non-connected state comprises at least one of an idle UE or an inactive UE.

20 Claims, 5 Drawing Sheets

(58) Field of Classification Search
CPC . H04W 56/003; H04W 68/005; H04W 72/23; H04L 5/0053; H04L 5/0048; Y02D 30/70
See application file for complete search history.

(56) References Cited

U.S. PATENT DOCUMENTS

| | | | | |
|---|---|---|---|---|
| 2021/0105739 | A1 | 4/2021 | Lin et al. | |
| 2021/0288773 | A1* | 9/2021 | Lin | H04W 56/001 |
| 2023/0019909 | A1* | 1/2023 | Zhang | H04L 5/0051 |
| 2023/0309060 | A1* | 9/2023 | Xu | H04W 52/0216 |
| 2024/0057197 | A1* | 2/2024 | Gurumoorthy | H04W 52/0229 |

FOREIGN PATENT DOCUMENTS

| | | | |
|---|---|---|---|
| CN | 112788681 | A | 5/2021 |
| CN | 112913182 | A | 6/2021 |
| EP | 3771261 | A1 | 1/2021 |
| WO | 2019028849 | A1 | 2/2019 |
| WO | 2021092353 | A1 | 5/2021 |

OTHER PUBLICATIONS

"Assistance RS occasions for IDLE/inactive mode", Huawei, HiSilicon, 3GPP TSG RAN WG1 #105-e, R1-2104252, E-meeting, May 10-27, 2021, 15 pages.

"Discussion on TRS/CSI-RS occasion(s) for IDLE/Inactive-mode UEs", CMCC, BGPP TSG RAN WG1 #105-e, R1-2104623, e-Meeting, May 10-27, 2021, 5 pages.

"Discussion on TRS/CSI-RS for idle/inactive UEs", Samsung, 3GPP TSG RAN WG1 #105-bis, R1-2105322, e-Meeting, May 10-27, 2021, 9 pages.

"Discussion on TRS/CSI-RS occasion(s) for idle/inactive UEs", LG Electronics, 3GPP TSG RAN WG1 #105-e, R1-2105435, e-Meeting, May 10-27, 2021, 7 pages.

"Provisioning of TRS occasions to Idle/Inactive UEs", Ericsson, BGPP TSG RAN WG1 #105-e, Tdoc R1-2105792, e-Meeting, May 10-27, 2021, 12 pages.

International Search Report and Written Opinion of International Application No. PCT/CN2021/100426, dated Mar. 1, 2022, 12 pages.

ZTE, Sanechips, "TRS for RRC idle and inactive UEs", 3GPP TSG RAN WG1 #104b-e, R1-2102566, e-Meeting, Apr. 20-Apr. 20, 2021, 6 pages.

"TRS/CSI-RS occasion(s) for idle/inactive UEs", Vivo, 3GPP TSG-RAN WG1 #103-e, R1-2007674, e-Meeting, Oct. 26-Nov. 13, 2020, 9 pages.

Office Action issued by the Patent Office of the Russian Federation Federal Institute of Industrial Property on Aug. 13, 2024, in corresponding Application No. RU 2024100835/07, 6 pages.

Office Action issued by the China State Intellectual Property Rights Bureau on Aug. 14, 2024, in corresponding Application No. CN 202180001886.X, 7 pages.

"Moderator summary for TRS/CSI-RS occasion(s) for idle/inactive UEs", Moderator (Samsung), 3GPP TSG RAN WG1 #103-e, R1-2008178, e-Meeting, Oct. 26-Nov. 13, 2020, 52 pages.

Xiaomi, "Paging enhancements for power saving", R1-2105573, 3GPP TSG RAN WG1 #105-e, e-Meeting, May 10-27, 2021, 5 pages.

Moderator (Samsung), "Moderator summary for TRS/CSI-RS occasion(s) for idle/inactive UEs", R1-2101218, 3GPP TSG RAN WG1 #104-e, e-Meeting, Jan. 2- Feb. 5, 2021, 84 pages.

Extended European Search Report issued in U.S. Appl. No. 21/945,456, filed Mar. 31, 2025, 10 pages.

Office Action for IN Application No. 202447003019 dated Mar. 13, 2026.

* cited by examiner

AVAILABILITY CONFIGURATION METHOD AND APPARATUS FOR A USER EQUIPMENT IN A NON-CONNECTED STATE

CROSS-REFERENCE TO RELATED APPLICATION

This application is the US national phase of International Application No. PCT/CN2021/100426, filed on Jun. 16, 2021, the content of which is hereby incorporated by reference in its entirety.

TECHNICAL FIELD

The disclosure relates to, but is not limited to, the wireless communication technical field, in particular to an information transmission method, an information transmission apparatus, a communication device and a storage medium.

BACKGROUND

In 3rd Generation Partnership Project (3GPP) standardization for the current R17 power saving project, techniques are proposed for downlink synchronization of a User Equipment (UE) in a non-connected state (e.g., an idle state or an inactive state) other than a connected state.

The UE in the non-connected state can achieve downlink synchronization with a base station by sending a shared Tracking Reference Signal (TRS) and/or a Channel State Information-Reference Signal (CSI-RS) to the base station.

SUMMARY

According to a first aspect of embodiments of the disclosure, an information transmission method, performed by an access network device, is provided. The method includes:

- sending an availability configuration, in which the availability configuration is configured to be used by a user equipment (UE) in a non-connected state for determining a reference signal configuration for downlink synchronization;
- in which the UE in the non-connected state includes at least one of: an idle UE or an inactive UE.

According to a second aspect of embodiments of the disclosure, an information transmission method, performed by a user equipment (UE), is provided. The method includes:

- receiving an availability configuration; and
- determining, based on the availability configuration, a reference signal configuration used by a UE in a non-connected state for downlink synchronization;
- in which the UE in the non-connected state includes at least one of: an idle UE or an inactive UE.

According to a third aspect of embodiments of the disclosure, a communication device is provided. The device includes: a processor and a memory storing a program executable by the processor. The processor is configured to send an availability configuration. The availability configuration is configured to be used by a user equipment (UE) in a non-connected state for determining a reference signal configuration for downlink synchronization. The UE in the non-connected state includes at least one of: an idle UE or an inactive UE.

It is understandable that the above general description and the following detailed descriptions are illustrative and explanatory only and do not limit embodiments of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of embodiments of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit embodiments of the disclosure. The singular forms of "a" and "the" used in embodiments of the disclosure and appended claims are also intended to include plural forms, unless the context clearly indicates other meanings. It is understandable that the term "and/or" as used herein refers to and includes any or all possible combinations of one or more associated listed items.

It is understandable that although the terms "first", "second", and "third" may be used in embodiments of the disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the term "if" as used herein can be interpreted as "when", "while" or "in response to determining".

Figure 1:
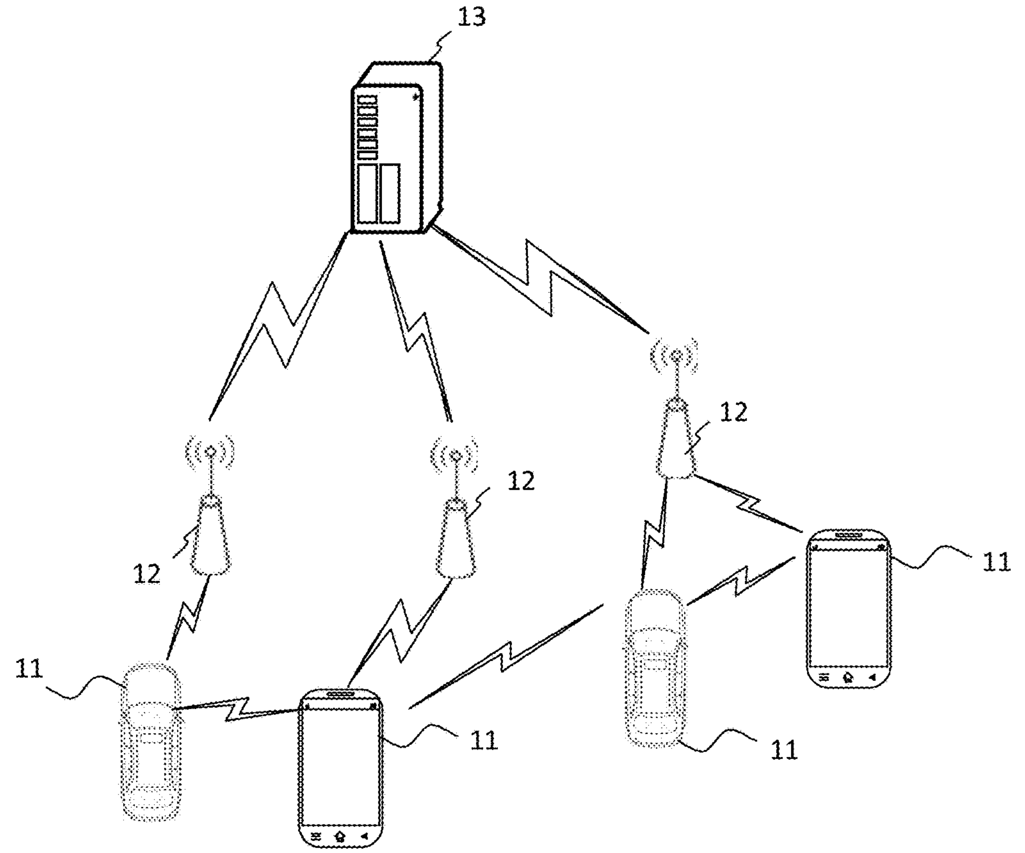
FIG. 1 is a schematic diagram illustrating a wireless communication system according to an embodiment.

FIG. 1 is a schematic diagram illustrating a wireless communication system according to an embodiment of the disclosure. As illustrated in FIG. 1, the wireless communication system is a communication system based on cellular mobile communication technology. The wireless communication system may include: a plurality of terminals 11 and a plurality of base stations 12.

The terminal 11 may be a device that provides voice and/or data connectivity to a user. The terminal 11 may communicate with one or more core networks via a Radio Access Network (RAN). The terminal 11 may be an Internet of Things (IoT) terminal, such as a sensor device, a cell phone (or "cellular" phone), and a computer with the IoT terminal. For example, the terminal 11 may be a stationary, portable, pocket-sized, handheld, computer-built, or vehicle-mounted device, such as, a Station (STA), a subscriber unit, a subscriber station, a mobile station, a mobile, a remote station, an access point, a remote terminal, an access terminal, a user terminal, a user agent, a user device, or a UE. Or, the terminal 11 may be an unmanned aerial vehicle device. Or, the terminal 11 may be an in-vehicle device, for example, an electronic control unit (ECU) having a wireless communication function, or a wireless communication device external to the ECU. Or, the terminal 11 can also be a roadside device, for example, a street light, a signal light, or other roadside devices having wireless communication function.

The base station 12 may be a network side device in the wireless communication system. The wireless communication system may be the 4th Generation (4G) mobile communication system, also known as a Long Term Evolution (LTE) system. Or, the wireless communication system may also be a 5G system, also known as New Radio (NR) system or 5G NR system. Or, the wireless communication system may be any next generation system of the 5G system. The access network in the 5G system may be called New Generation-RAN (NG-RAN) or machine type communication (MTC) system.

The base station 12 can be an evolved base station (eNB) employed in the 4G system. Or, the base station 12 may be a base station (gNB) with a centralized distributed architecture employed in the 5G system. When the base station 12 adopts the centralized distributed architecture, it usually includes a Central Unit (CU) and at least two Distributed Units (DUs). The CU is equipped with protocol stacks of a Packet Data Convergence Protocol (PDCP) layer, a Radio Link Control (RLC) layer, or a Media Access Control (MAC) layer. The DU is equipped with the protocol stack of a physical (PHY) layer, and the specific implementation of the base station 12 is not limited in the embodiment of the disclosure.

A wireless connection can be established between the base station 12 and the terminal 11 via a radio interface. In different implementations, the radio interface is a radio interface based on the 4G standard. Or, the radio interface is a radio interface based on the 5G standard, such as a NR. Or, the radio interface may also be a radio interface based on the standard of the next generation of 5G.

In some embodiments, an End to End (E2E) connection can also be established between the terminals 11 in scenarios, such as, Vehicle to Vehicle (V2V) communication, Vehicle to Infrastructure (V2I) communication, and Vehicle to Pedestrian (V2P) communication in Vehicle to Everything (V2X) communication.

In some embodiments, the above wireless communication system may also include a network management device 13.

The plurality of base stations 12 are connected to the network management device 13 respectively. The network management device 13 may be a core network device in the wireless communication system, for example, a Mobility Management Entity (MME) in an Evolved Packet Core (EPC). Or, the network management device may be other core network devices, such as a Serving GateWay (SGW), a Public Data Network GateWay (PGW), a Policy and Charging Rules Function (PCRF), or a Home Subscriber Server (HSS), etc. The implementation form of the network management device 13 is not limited in the embodiments of the disclosure.

Execution objects involved in embodiments of the disclosure include, but not are limited to, UEs such as cell phone terminals that support cellular mobile communication, and base stations, etc.

Figure 2:
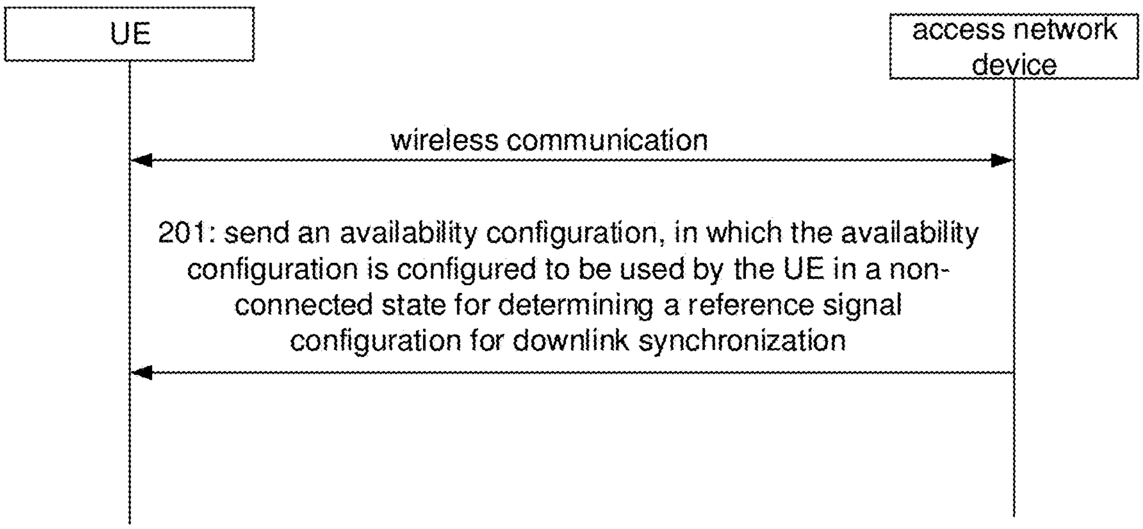
FIG. 2 is a flowchart illustrating an information transmission method according to an embodiment.

As illustrated in FIG. 2, an information transmission method is provided in embodiments of the disclosure. The method may be performed by a base station in a cellular mobile communication system. The method includes the following.

At step 201, an availability configuration is sent. The availability configuration is configured to be used by a user equipment (UE) in a non-connected state for determining reference signal configuration(s) for downlink synchronization.

The UE in the non-connected state includes: an idle UE and/or an inactive UE.

The UE may be a cell phone terminal that uses the cellular mobile communication technology for wireless communication. The base station may be a communication device that provides an access network interface to the UE in the cellular mobile communication system.

The UE needs to perform the downlink synchronization when establishing a communication connection with an access network device such as a base station.

The access network device may send a reference signal to the UE for performing the downlink synchronization. Before sending the reference signal, the access network device may send a reference signal configuration for indicating physical resources used by the reference signal. The UE receives the reference signal and performs the downlink synchronization based on the reference signal configuration.

In an embodiment, the reference signal configuration(s) include(s): a signal configuration for a Tracking Reference Signal (TRS) and/or a signal configuration for a Channel State Information-Reference Signal (CSI-RS).

The CSI-RS may be used by the UE for obtaining at least one of following parameters: channel status, beam management, mobility management or rate matching.

There may be a small deviation between frequencies of physical crystal oscillators of the UE and the base station, and the frequencies may not be completely the same, so that a radio frequency (RF) carrier signal received by the UE may have a deviation in the phase, which is expressed as a rotation in the phase in a demodulation symbol constellation diagram of received subcarriers. That is, a received modulation symbol deviates for a certain phase angle, which is caused by the accumulation of frequency deviation in the time dimension. At this time, a tracking reference signal (TRS) may be used to track rotated phases of other data signals. The TRS is a multi-cycle CSI-RS, more exactly a NZP-CSI-RS with a 4-1 port and 3 CSI-RS densities, and located in two consecutive time slots. A minimum interval between two TRSs within one time slot is 4 Orthogonal Frequency Division Multiplexing (OFDM) symbols in the time dimension and 4 subcarriers in the frequency domain. Errors in the frequency domain and in the time domain may be estimated based on the TRS. Data is received, the errors are compensated, and then it may be rotated back to a modulation coordinate location as originally sent.

In the related art, the TRS and/or the CSI-RS are only used by the UE in the connected state for performing the downlink synchronization. In this disclosure, the UE in the non-connected state may also use the TRS and/or CSI-RS for performing the downlink synchronization.

In the related art, the UE may perform the downlink synchronization by receiving Synchronization Signal Blocks (SSBs) for 3 cycles, causing lower synchronization efficiency. In this disclosure, the UE may adopt the TRS and/or the CSI-RS for performing the downlink synchronization, which can be done by fewer SSB cycles (e.g., it can be done through receiving the SSB for one cycle).

The reference signal configuration(s) may be signal configuration(s) for the TRS and/or CSI-RS that is/are configured by the access network device for the UE in the connected state, and the UE in the non-connected state may share the reference signal configuration(s) and use the TRS and/or CSI-RS for performing the downlink synchronization. Or, the reference signal configuration(s) may be signal configuration(s) for the TRS and/or CSI-RS that is/are configured by the access network device for the UE in the connected state and the UE in the non-connected state. Or, the reference signal configuration(s) may be signal configuration(s) for the TRS and/or CSI-RS that is/are configured by the access network device for the UE in the non-connected state. The UE in the non-connected state may use the TRS and/or CSI-RS for performing the downlink synchronization based on the configured reference signal configuration(s).

The reference signal configuration(s) for the reference signal(s) may be sent by the access network device to the UE via a downlink signaling such as a Radio Resource Control (RRC) signaling when the UE is in the connected state. The access network device may send an availability configuration for indicating whether the reference signal configuration(s) may be used for the downlink synchronization.

In an embodiment, the reference signal configuration includes one of:

a physical layer resource and a Quasi co-located (QCL) parameter; or the physical layer resource.

The reference signal configuration(s) may include one or more signal configurations for the TRS and/or the CSI-RS. The physical layer resource may include a time domain resource and a frequency domain resource. The QCL parameter includes: a QCL type, etc.

The availability configuration may at least be used to indicate whether the reference signal configuration(s) is/are effective. Or, the availability configuration may be used to indicate, among a plurality of reference signal configurations, reference signal configuration(s) that is/are effective and reference signal configuration(s) that is/are ineffective. Or, the availability configuration may indicate a portion of configuration contents that are effective and/or a portion of configuration contents that are ineffective in a reference signal configuration. For example, the availability configuration may indicate, in a reference signal configuration, frequency domain resource(s) that is/are effective and frequency domain resource(s) that is/are ineffective.

The access network device may send the availability configuration to the UE, and the UE may determine, based on the availability configuration, the reference signal configuration(s) that can be adopted and the reference signal configuration(s) that cannot be adopted.

In an embodiment, the UE may perform the downlink synchronization based on the reference signal(s) configured by the reference signal configuration(s) that may be adopted.

In an embodiment, the access network device may carry the availability configuration in a physical layer signaling and send to the UE.

Herein, the availability configuration carried in the physical layer signaling may be explicitly or implicitly indicated. For example, the access network device may use at least one bit of the physical layer signaling to indicate the availability configuration. Or, the access network device may send a preset physical layer signaling, which implicitly indicates the availability configuration.

In this way, by means of the availability configuration configured to be used by the UE in the non-connected state for determining the reference signal configuration(s) for the downlink synchronization, flexibility in the use of a reference signal configuration is improved based on the ability to indicate whether the reference signal configuration is used for synchronization based on actual needs.

In an embodiment, the availability configuration includes: a first configuration or a second configuration.

The first configuration is configured to indicate that the reference signal configuration(s) is/are effective.

The second configuration is configured to indicate that the reference signal configuration(s) is/are ineffective.

In embodiments of the disclosure, the availability configuration may be carried in any appropriate signaling.

The availability configuration may indicate whether reference signal configuration(s) for the reference signal(s) such as a TRS and/or a CSI-RS is/are effective. The availability configuration may be the first configuration or the second configuration. The first configuration is configured to indicate that the reference signal configuration(s) is/are effective, which means that the access network device will send reference signal(s) based on the reference signal configuration(s). For example, the access network device will send the reference signal(s) using the physical resources configured by the reference signal configuration(s). The UE may perform the downlink synchronization based on the TRS and/or CSI-RS configured by the reference signal configuration(s). The second configuration is configured to indicate that the reference signal configuration(s) is/are ineffective, which means that the access network device will not send reference signal(s) based on the reference signal configuration(s). For example, the access network device will not use the physical resources configured by the reference signal configuration(s) to send the reference signal(s). The UE cannot perform the downlink synchronization based on the TRS and/or CSI-RS configured by the reference signal configuration(s).

The availability configuration may use different values to indicate whether the reference signal configuration(s) is/are effective. For example, the value “0” may be used to indicate that the reference signal configuration(s) is/are ineffective, and the value “1” may be used to indicate that the reference signal configuration(s) is/are effective. Or, the value “1” may be used to indicate that the reference signal configuration(s) is/are ineffective, and the value “0” may be used to indicate that the reference signal configuration(s) is/are effective.

For example, the idle UE and/or inactive UE may perform the downlink synchronization through the TRS and/or CSI-RS based on the reference signal configuration(s). When the availability configuration is the first configuration, which means that the reference signal configuration(s) is/are effective, the UE may detect the TRS and/or CSI-RS on the transmission resources configured by the reference signal configuration(s) after receiving the first configuration of the reference signal configuration(s).

In an embodiment, the availability configuration is carried by paging DCI; and/or the availability configuration is associated with a paging early indication (PEI).

The availability configuration may be carried by the paging DCI. The paging DCI may be used to schedule paging messages. The access network device can carry the availability configuration in the paging DCI. For example, the availability configuration may occupy one or more bits of the paging DCI to indicate whether the reference signal configuration(s) is/are effective.

The availability configuration may be associated with the PEI. The PEI is used to indicate to the UE whether there is a paging message for the UE in a Paging Occasion (PO). The availability configuration may be indicated through the information associated with the PEI. For example, the information carried by the PEI and/or signal characteristic information of the PEI is used to indicate the availability configuration.

The availability configuration based on the physical layer signaling such as the paging DCI and the PEI is more flexible than MAC configuration and RRC configuration, and dynamic configuration may be realized.

In an embodiment, the PEI includes:

- a PEI carried by DCI, in which the DCI carrying the PEI also carries the availability configuration; or
- a sequence-based PEI signal, in which the PEI signal is a physical layer signal, and the PEI signal is in a correspondence relation with the availability configuration.

The PEI can occupy one or more bits of the DCI. The availability configuration may be carried by the DCI carrying the PEI. For example, the availability configuration may occupy one or more bits of the PEI, or the availability configuration may occupy one or more bits, that are different from the bit(s) occupied by the PEI, of the DCI.

Or, the PEI may be a physical layer signal. The PEI may indicate whether there is a paging message in the PO through a signal sequence. The PEI may indicate different availability configurations through physical resources. For example, the first configuration and the second configuration are indicated respectively is indicated through different frequency domain resources, and further whether the reference signal configuration(s) is/are effective is indicated.

For example, as shown in Table 1, the access network device, such as the base station, may indicate the availability configuration to the UE through either the paging DCI or the PEI, or the access network device may indicate the availability configuration to the UE through the paging DCI and the PEI. The base station may first configure whether to use the physical layer to indicate the availability configuration, i.e., whether to use the paging DCI and/or the PEI to indicate the availability configuration. In Table 1, "configured by the base station" means that the physical layer is used to indicate the availability configuration, and "not configured" means that physical layer is not used to indicate the availability configuration.

TABLE 1

| serial number | PEI | Paging DCI | result |
|---|---|---|---|
| 1 | configured by the base station and availability configuration | not configured | use the information associated with the PEI as availability configuration for indicating whether the reference signal configuration(s) for the TRS/CSI-RS is/are effective |
| 2 | not configured | configured by the base station and availability configuration | use the paging DCI to carry the availability configuration for indicating whether the reference signal configuration(s) for the TRS/CSI-RS is/are effective |
| 3 | configured by the base station and availability configuration | configured by the base station and availability configuration | use the information associated with the PEI as availability configuration for indicating whether the reference signal configuration(s) for the TRS/CSI-RS is/are effective, and use the paging DCI to carry the availability configuration for indicating whether the reference signal configuration(s) for the TRS/CSI-RS is/are effective |
| 4 | not configured | not configured | do not use any physical layer to indicate availability configuration |

In an embodiment, sending the availability configuration includes one of:

- sending DCI for indicating the first configuration;
- sending DCI for indicating the second configuration;
- sending a PEI for indicating the first configuration; or
- sending a PEI for indicating the second configuration.

When the DCI is used to carry the availability configuration, or the availability configuration is associated with the PEI, the DCI or PEI may implicitly indicate the first configuration or the second configuration, or the DCI or PEI may explicitly indicate the first configuration or the second configuration.

For example, the DCI or PEI may implicitly indicate the first configuration or the second configuration. As shown in Table 1, in the cases about the serial numbers 1 and 2, there is only one case when the DCI is used to carry the availability configuration or the availability configuration is associated with the PEI. When the base station configures to use the DCI to carry the availability configuration, the DCI may implicitly indicate the first configuration or the second configuration. When the UE receives the DCI, the UE may determine whether the reference signal configuration(s) is/are effective. The DCI may be a DCI or a type of DCI that is agreed in advance, such as the paging DCI. When the base station configures that the availability configuration is associated with the PEI, the PEI may implicitly indicate the first configuration or the second configuration. When the UE receives the PEI, the UE may determine whether the reference signal configuration(s) is/are effective. The PEI may be a PEI that is agreed in advance, such as, a PEI using a preset physical transmission resource.

In this way, by implicitly indicating the availability configuration through the DCI or the PEI, there is no need to change the DCI or the PEI. Meanwhile, the amount of information in the DCI or the PEI is increased, and communication efficiency is improved.

In an embodiment, when the access network device sends only the first configuration, when the UE does not receive the first configuration, the UE determines that the current configuration is the second configuration. When the access network device sends only the second configuration, when the UE does not receive the second configuration, the UE determines that the current configuration is the first configuration.

For example, the access network device may only send the DCI that implicitly indicates the first configuration. When the UE does not receive the DCI, the UE may determine that the reference signal configuration(s) is/are ineffective, that is, the UE determines that the current configuration is the second configuration.

Figure 3:
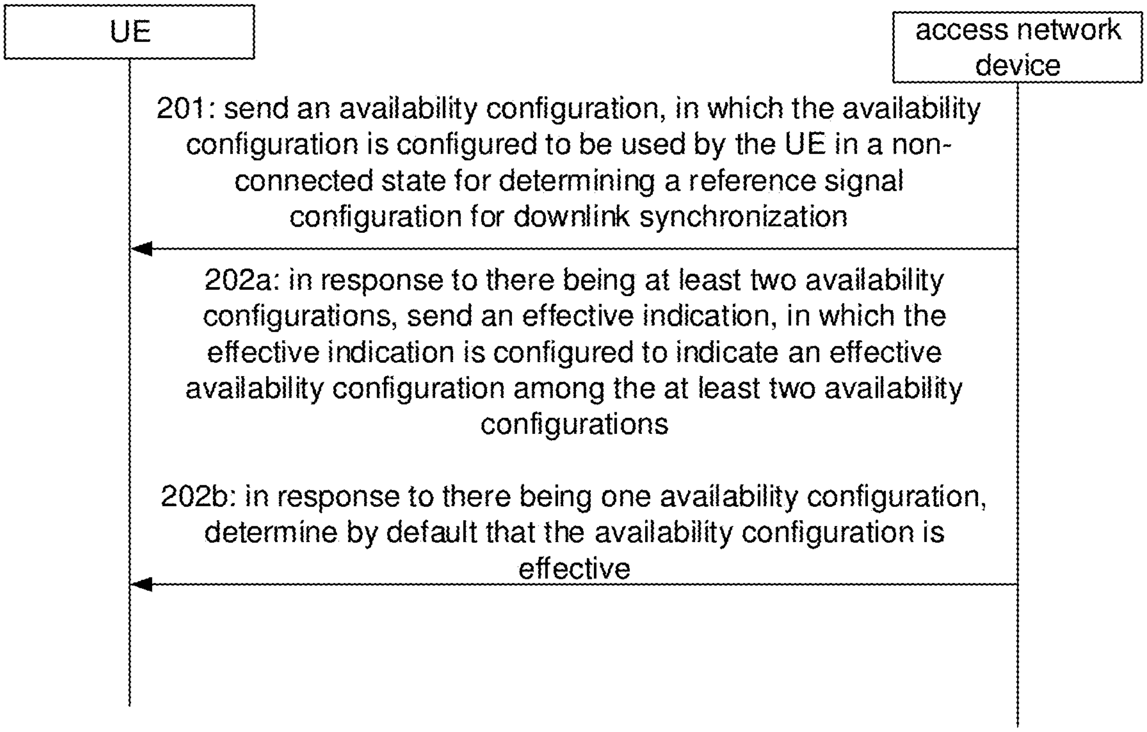
FIG. 3 is a flowchart illustrating another information transmission method according to an embodiment.

In an embodiment, as illustrated in FIG. 3, the method further includes at least one of the following.

At step 202*a*, an effective indication is sent in response to there being at least two availability configurations, in which the effective indication is configured to indicate availability configuration(s) that is/are effective among the at least two availability configurations.

At step 202*b*, it is determined by default that an availability configuration is effective in response to there is only the availability configuration.

The availability configurations may be carried through different physical layer signaling. The UE may receive multiple availability configurations carried separately through different physical layer signaling. For example, the UE may receive two availability configurations through the DCI and PEI respectively. Or, the UE may receive 3 availability configurations carried through 3 different physical layer signaling respectively. The effective indication may indicate which availability configuration(s) is/are effective among the multiple availability configurations. The effective indication may indicate the physical layer signaling associated with the availability configuration(s) that is/are effective. For example, the effective indication may indicate that the availability configuration carried in the DCI is effective.

For example, when the access network device configures that the availability configuration is carried by the DCI or the availability configuration is associated with the PEI, the access network device may send the effective indication to indicate that the availability configuration carried by the DCI or the availability configuration associated with the PEI is effective. When the UE receives both the availability configuration carried by the DCI and the availability configuration associated with the PEI, the UE may determine which availability configuration is effective based on the effective indication. Therefore, judgment errors caused by the UE being unable to distinguish which availability configuration(s) is/are effective and which availability configuration(s) is/are ineffective may be reduced, and the situation where the UE misjudges whether the reference signal configuration is effective may be reduced.

When the access network device configures that the availability configuration is carried by the DCI or the availability configuration is associated with the PEI, when the access network device carries the availability configuration by the DCI, the UE determines that the availability configuration carried by the DCI is effective. When the access network device indicates the availability configuration through the PEI, the UE determines that the availability configuration associated with the PEI is effective.

In an embodiment, sending the availability configuration includes: sending a system information block (SIB) carrying the availability configuration.

The access network device may also carry the availability configuration through a higher layer signaling to indicate whether the reference signal configuration(s) is/are effective.

For example, for the case about the serial number 4 in Table 1, when the base station neither configures that the availability configuration is carried by the DCI nor configures that the availability configuration is associated with the PEI, the base station may carry the availability configuration through the SIB. The UE may receive the SIB and analyze the SIB to obtain the availability configuration from.

In this way, the access network device may indicate the availability configuration through the physical layer, or carry the availability configuration through the higher layer signaling, thereby improving the flexibility of sending the availability configuration.

Figure 4:
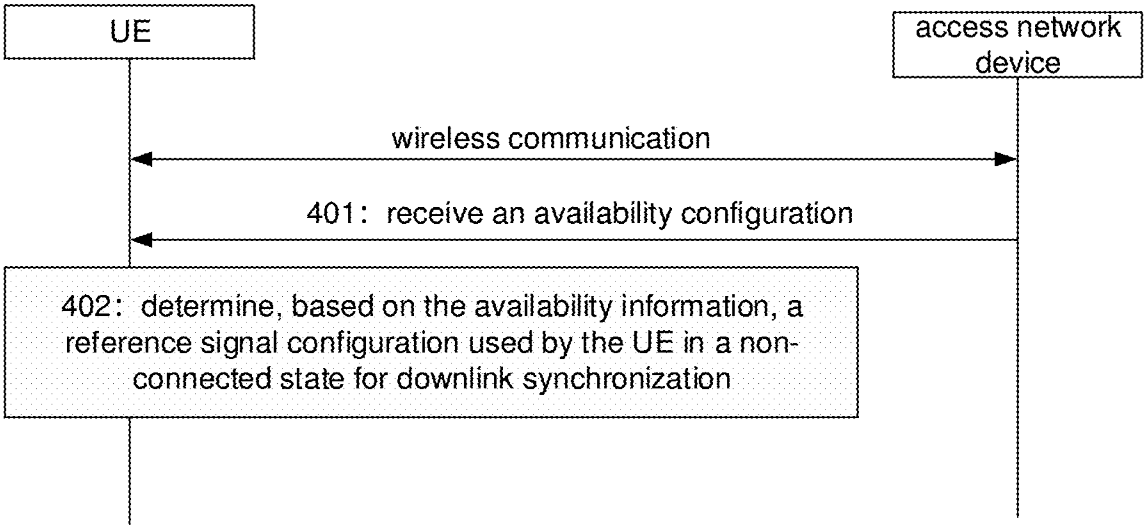
FIG. 4 is a flowchart illustrating yet another information transmission method according to an embodiment.

As illustrated in FIG. 4, embodiments provide an information transmission method. The information transmission method can be performed by a UE in a cellular mobile communication system. The method includes the following.

At step 401, an availability configuration is received.

At step 402, reference signal configuration(s) used by a UE in a non-connected state for downlink synchronization is/are determined based on the availability configuration.

The UE in the non-connected state includes: an idle UE and/or an inactive UE.

The UE may be a cell phone terminal that uses the cellular mobile communication technology for wireless communication. The base station may be a communication device that provides an access network interface to the UE in the cellular mobile communication system.

The UE needs to perform the downlink synchronization when establishing a communication connection with an access network device such as a base station.

The access network device may send a reference signal to the UE for performing the downlink synchronization. Before sending the reference signal, the access network device may send a reference signal configuration for indicating physical resources used by the reference signal. The UE receives the reference signal and performs the downlink synchronization based on the reference signal configuration.

In an embodiment, the reference signal configuration(s) include(s):

a signal configuration for a TRS and/or a signal configuration for a CSI-RS.

The CSI-RS may be used by the UE for obtaining at least one of following parameters: channel status, beam management, mobility management or rate matching.

There may be a small deviation between frequencies of physical crystal oscillators of the UE and the base station, and the frequencies may not be completely the same, so that a RF carrier signal received by the UE may have a deviation in the phase, which is expressed as a rotation in the phase in a demodulation symbol constellation diagram of received subcarriers. That is, a received modulation symbol deviates for a certain phase angle, which is caused by the accumulation of frequency deviation in the time dimension. At this time, a TRS may be used to track rotated phases of other data signals. The TRS is a multi-cycle CSI-RS, more exactly a NZP-CSI-RS with a 4-1 port and 3 CSI-RS densities, and located in two consecutive time slots. A minimum interval between two TRSs within one time slot is 4 OFDM symbols in the time dimension and 4 subcarriers in the frequency domain. Errors in the frequency domain and in the time domain may be estimated based on the TRS. Data is received, the errors are compensated, and then it may be rotated back to a modulation coordinate location as originally sent.

In the related art, the TRS and/or the CSI-RS are only used by the UE in the connected state for performing the downlink synchronization. In this disclosure, the UE in the non-connected state may also use the TRS and/or CSI-RS for performing the downlink synchronization.

In the related art, the UE may perform the downlink synchronization by receiving SSBs for 3 cycles, causing lower synchronization efficiency. In this disclosure, the UE may adopt the TRS and/or the CSI-RS for performing the downlink synchronization, which can be done by fewer SSB cycles (e.g., it can be done by one SSB cycle).

The reference signal configuration(s) may be signal configuration(s) for the TRS and/or CSI-RS that is/are configured by the access network device for the UE in the connected state, and the UE in the non-connected state may share this reference signal configuration and use the TRS and/or CSI-RS for performing the downlink synchronization. Or, the reference signal configuration(s) may be signal configuration(s) for the TRS and/or CSI-RS that is/are configured by the access network device for the UE in the connected state and the UE in the non-connected state. Or, the reference signal configuration(s) may be signal configuration(s) for the TRS and/or CSI-RS that is/are configured by the access network device for the UE in the non-connected state. The UE in the non-connected state may use the TRS and/or the CSI-RS for performing the downlink synchronization based on the configured reference signal configuration(s).

The reference signal configuration(s) for the reference signal(s) may be sent by the access network device to the UE via a downlink signaling such as a RRC signaling when the UE is in the connected state. The access network device may send an availability configuration for indicating whether the reference signal configuration(s) may be used for the downlink synchronization.

In an embodiment, the reference signal configuration includes one of:

a physical layer resource and a QCL parameter; or the physical layer resource.

The reference signal configuration(s) may include one or more signal configurations for the TRS and/or the CSI-RS. The physical layer resource may include a time domain resource and a frequency domain resource. The QCL parameter includes: a QCL type, etc.

The availability configuration may at least be used to indicate whether the reference signal configuration(s) is/are effective. Or, the availability configuration may be used to indicate, among a plurality of the reference signal configurations, reference signal configuration(s) that is/are effective and reference signal configuration(s) that is/are ineffective. Or, the availability configuration may indicate a portion of configuration contents that are effective and/or a portion of configuration contents that are ineffective in a reference signal configuration. For example, the availability configuration may indicate, in a reference signal configuration, frequency domain resource(s) that is/are effective and frequency domain resource(s) that is/are ineffective.

The access network device may send the availability configuration to the UE, and the UE may determine, based on the availability configuration, the reference signal configuration(s) that may be adopted and the reference signal configuration(s) that cannot be adopted.

In an embodiment, the UE may perform the downlink synchronization based on the reference signal(s) configured by the reference signal configuration(s) that may be adopted.

In an embodiment, the access network device may carry the availability configuration in a physical layer signaling and send to the UE.

Herein, the availability configuration carried in the physical layer signaling may be explicitly or implicitly indicated. For example, the access network device may use at least one bit of the physical layer signaling to indicate the availability configuration. Or, the access network device may send a preset physical layer signaling, which implicitly indicates the availability configuration.

In this way, by means of the availability configuration configured to be used by the UE in the non-connected state for determining the reference signal configuration(s) for the downlink synchronization, flexibility in the use of a reference signal configuration is improved based on the ability to indicate whether the reference signal configuration is used for synchronization based on actual needs.

Determining, based on the availability configuration, the reference signal configuration(s) used by the UE in the non-connected state for performing the downlink synchronization includes one of:

determining that the reference signal configuration(s) is/are effective in response to receiving a first configuration; or determining that the reference signal configuration(s) is/are ineffective in response to receiving a second configuration.

In embodiments of the disclosure, the availability configuration may be carried in any appropriate signaling.

The availability configuration may indicate whether reference signal configuration(s) for reference signal(s) such as a TRS and/or a CSI-RS is/are effective. The availability configuration may be the first configuration or the second configuration. The first configuration is configured to indicate that the reference signal configuration(s) is/are effective, which means that the access network device will send reference signal(s) based on the reference signal configuration(s). For example, the access network device will send the reference signal(s) using the physical resources configured by the reference signal configuration(s). The UE may perform the downlink synchronization based on the TRS and/or CSI-RS configured by the reference signal configuration(s). The second configuration is configured to indicate that the reference signal configuration(s) is/are ineffective, which means that the access network device will not send reference signal(s) based on the reference signal configuration(s). For example, the access network device will not use the physical resources configured by the reference signal configuration(s) to send the reference signal(s). The UE cannot perform the downlink synchronization based on the TRS and/or CSI-RS configured by the reference signal configuration(s).

The availability configuration may use different values to indicate whether the reference signal configuration(s) is/are effective. For example, the value “0” may be used to indicate that the reference signal configuration(s) is/are ineffective, and the value “1” may be used to indicate that the reference signal configuration(s) is/are effective. Or, the value “1” may be used to indicate that the reference signal configuration(s) is/are ineffective, and the value “0” may be used to indicate that the reference signal configuration(s) is/are effective.

For example, the idle UE and/or inactive UE may perform the downlink synchronization through the TRS and/or the CSI-RS based on the reference signal configuration(s). When the availability configuration is the first configuration, which means that the reference signal configuration(s) is effective, the UE may detect the TRS and/or CSI-RS on the transmission resources configured by the reference signal configuration(s) after receiving the first configuration of the reference signal configuration(s).

In an embodiment, receiving the availability configuration includes at least one of:

receiving paging DCI carrying the availability configuration; or receiving a PEI, in which the PEI is associated with the availability configuration.

The availability configuration may be carried by the paging DCI. The paging DCI may be used to schedule paging messages. The access network device can carry the availability configuration in the paging DCI. For example, the availability configuration may occupy one or more bits of the paging DCI to indicate whether the reference signal configuration(s) is/are effective.

The availability configuration may be associated with the PEI. The PEI is used to indicate to the UE whether there is a paging message for the UE in a PO. The availability configuration may be indicated through the information associated with the PEI. For example, the information carried by the PEI and/or signal characteristic information of the PEI is used to indicate the availability configuration.

The availability configuration based on the physical layer signaling such as the paging DCI and the PEI is more flexible than MAC configuration and RRC configuration, and dynamic configuration may be realized.

In an embodiment, the PEI includes:

a PEI carried by DCI, in which the DCI carrying the PEI also carries the availability configuration; or a sequence-based PEI signal, in which the PEI signal is a physical layer signal, and the PEI signal is in a correspondence relation with the availability configuration.

The PEI can occupy one or more bits of the DCI. The availability configuration may be carried by the DCI carrying the PEI. For example, the availability configuration may occupy one or more bits of the PEI, or the availability configuration may occupy one or more bits, that are different from the bit(s) occupied by the PEI, of the DCI.

Or, the PEI may be a physical layer signal. The PEI may indicate whether there is a paging message in the PO through a signal sequence. The PEI may indicate different availability configurations through physical resources. For example, the first configuration and the second configuration are indicated respectively through different frequency domain resources, and further whether the reference signal configuration is effective is indicated.

For example, as shown in Table 1, the access network device such as the base station may indicate the availability configuration to the UE through either the paging DCI or the PEI, or the access network device may indicate the availability configuration to the UE through the paging DCI and the PEI. The base station may first configure whether to use the physical layer to indicate the availability configuration, i.e., whether to use the paging DCI and/or PEI to indicate the availability configuration. In Table 1, "configured by the base station" means that the physical layer is used to indicate the availability configuration, and "not configured" means that physical layer is not used to indicate the availability configuration.

In an embodiment, receiving the availability configuration includes one of:

receiving paging DCI for indicating the first configuration;

receiving paging DCI for indicating the second configuration;

receiving a PEI for indicating the first configuration; or receiving a PEI for indicating the second configuration.

When the DCI is used to carry the availability configuration, or the availability configuration is associated with the PEI, the DCI or PEI may implicitly indicate the first configuration or the second configuration.

For example, as shown in Table 1, in the cases about the serial numbers 1 and 2, there is only one case when the DCI is used to carry the availability configuration or the availability configuration is associated with the PEI. When the base station configures to use the DCI to carry the availability configuration, the DCI may implicitly indicate the first configuration or the second configuration. When the UE receives the DCI, the UE may determine whether the reference signal configuration(s) is/are effective. The DCI may be a DCI or a type of DCI that is agreed in advance, such as the paging DCI. When the base station configures that the availability configuration is associated with the PEI, the PEI may implicitly indicate the first configuration or the second configuration. When the UE receives the PEI, the UE may determine whether the reference signal configuration(s) is/are effective. The PEI may be a PEI that is agreed in advance, such as, a PEI using a preset physical transmission resource.

In this way, by implicitly indicating the availability configuration through the DCI or PEI, there is no need to change the DCI or the PEI. Meanwhile, the amount of information in the DCI or the PEI is increased, and communication efficiency is improved.

In an embodiment, when the access network device sends only the first configuration, when the UE does not receive the first configuration, the UE determines that the current configuration is the second configuration. When the access network device sends only the second configuration, when the UE does not receive the second configuration, the UE determines that the current configuration is the first configuration.

For example, the access network device may only send the DCI that implicitly indicates the first configuration. When the UE does not receive the DCI, the UE may determine that the reference signal configuration(s) is/are ineffective, that is, the UE determines that the current configuration is the second configuration.

In an embodiment, the method further includes one of:

receiving an effective indication in response to there being at least two availability configurations, and determining availability configuration(s) that is/are effective among the at least two availability configurations based on the effective indication.

Herein, the availability configuration may be carried through different physical layer signaling. The UE may receive multiple availability configurations carried separately through different physical layer signaling. For example, the UE may receive two availability configurations through the DCI and PEI respectively. Or, the UE may receive 3 availability configurations carried through 3 different physical layer signaling respectively. The effective indication may indicate which availability configuration(s) is/are effective among the multiple availability configurations. The effective indication may indicate the physical layer signaling associated with the availability configuration(s) that is/are effective. For example, the effective indication may indicate that the availability configuration carried in the DCI is effective.

For example, in response to there being one availability configuration, it is determined by default that the availability configuration is effective. When the access network device configures that the availability configuration is carried by the DCI or the availability configuration is associated with the PEI, the access network device may send the effective indication to indicate that the availability configuration carried by the DCI or the availability configuration associated with the PEI is effective. When the UE receives both the availability configuration carried by the DCI and the availability configuration associated with the PEI, the UE may determine which availability configuration is effective based on the effective indication. Therefore, judgment errors caused by the UE being unable to distinguish which availability configuration(s) is/are effective and which availability configuration(s) that is/are ineffective may be reduced, and the situation where the UE misjudges whether the reference signal configuration is effective may be reduced.

When the access network device configures that the availability configuration is carried by the DCI or the availability configuration is associated with the PEI, when the access network device carries the availability configuration in the DCI, the UE determines that the availability configuration carried by the DCI is effective. When the access network device indicates the availability configuration through the PEI, the UE determines that the availability configuration associated with the PEI is effective.

In an embodiment, receiving the availability configuration includes: receiving a SIB carrying the availability configuration.

The access network device may also carry the availability configuration through a higher layer signaling to indicate whether the reference signal configuration(s) is/are effective.

For example, for the case about the serial number 4 in Table 1, when the base station neither configures that the availability configuration is carried by the DCI nor configures that the availability configuration is associated with the PEI, the base station may carry the availability configuration through the SIB. The UE may receive the SIB and analyze the SIB to obtain the availability configuration.

In this way, the access network device may indicate the availability configuration through the physical layer, or carry the availability configuration through the higher layer signaling, thereby improving the flexibility of sending the availability configuration.

A specific example is provided below in combination with any of the above embodiments.

1. The base station configures the reference signal configuration(s) for the TRS/CSI-RS for the idle UE to perform the downlink time-frequency synchronization, and also configures the availability configuration for indicating whether the reference signal configuration(s) is/are effective through the physical layer.
2. As shown in Table 1, the base station indicates the availability configuration to the UE through one of the paging DCI or PEI or indicates the availability configuration to the UE through the paging DCI and PEI. The base station may first configure whether to use the physical layer to indicate the availability configuration, i.e., whether to use the paging DCI and/or PEI to indicate the availability configuration. In Table 1, "configured by the base station" means that the physical layer is used to indicate the availability configuration, and "not configured" means that physical layer is not used to indicate the availability configuration.
3. The above PEI is DCI-based PEI, or a sequence-based PEI.
4. Since there is only one configuration in the cases about the serial number 1 and serial number 2, the availability configuration can be omitted. That is, the configuration is effective.
5. For the case about serial number 4, the SIB method can be used, i.e., a higher layer notification is used.

Figure 5:
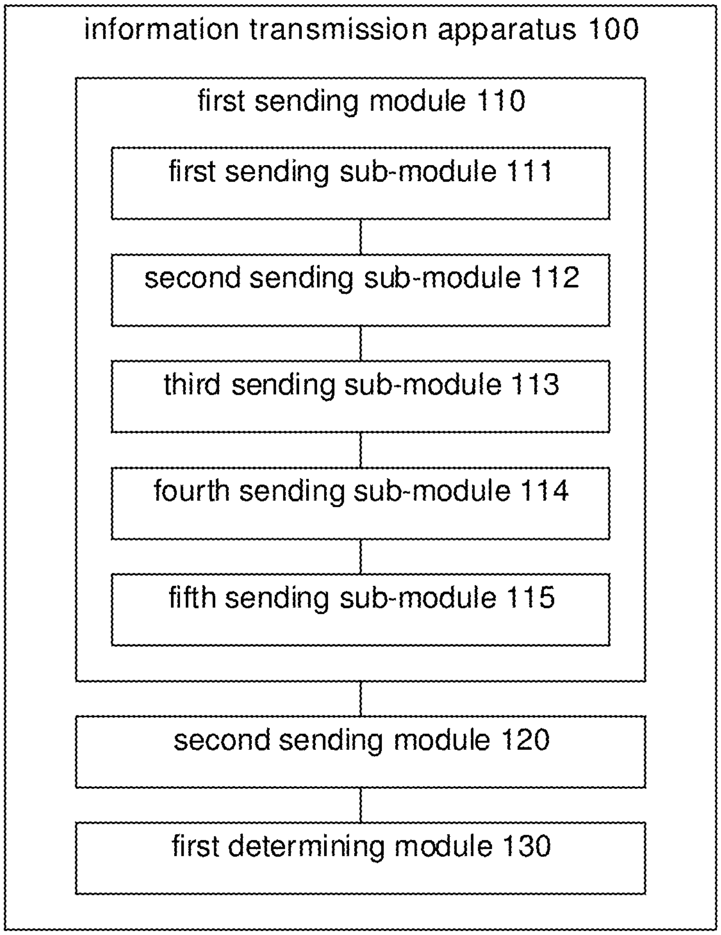
FIG. 5 is a block diagram illustrating an information transmission apparatus according to an embodiment.

Embodiments of the disclosure also provide an information transmission apparatus, applied to an access network device for wireless communication. As illustrated in FIG. 5, the information transmission apparatus 100 includes a first sending module 110.

The first sending module 110 is configured to send an availability configuration, in which the availability configuration is configured to be used by a UE in a non-connected state for determining reference signal configuration(s) for downlink synchronization.

The UE in the non-connected state includes: an idle UE and/or an inactive UE.

In an embodiment, the availability configuration includes:

a first configuration configured to indicate that the reference signal configuration(s) is/are effective; or a second configuration configured to indicate that the reference signal configuration(s) is/are ineffective.

In an embodiment, the reference signal configuration includes one of:

a physical layer resource and a QCL parameters; or the physical layer resource.

In an embodiment, the availability configuration is carried by paging DCI; and/or the availability configuration is associated with a PEI.

In an embodiment, the PEI includes:

a PEI carried by DCI, in which the DCI carrying the PEI also carries the availability configuration; or a sequence-based PEI signal, in which the PEI signal is a physical layer signal, and the PEI signal is in a correspondence relation with the availability configuration.

In an embodiment, the first sending module 110 includes one of:

a first sending sub-module 111, configured to send paging DCI for indicating the first configuration;

a second sending sub-module 112, configured to send paging DCI for indicating the second configuration;

a third sending sub-module 113, configured to send a PEI for indicating the first configuration; or a fourth sending sub-module 114, configured to send a PEI for indicating the second configuration.

In an embodiment, the apparatus at least includes one of:

a second sending module 120, configured to, in response to there being at least two availability configurations, send an effective indication, in which the effective indication indicates availability configuration(s) that is/are effective among the at least two availability configurations; and a first determining module 130, configured to, in response to there being one availability configuration, determine by default that the availability configuration is effective.

In an embodiment, the first sending module 110 includes:

a fifth sending sub-module 115, configured to send a SIB carrying the availability configuration.

In an embodiment, the reference signal configuration(s) include(s):

a signal configuration for a TRS and/or a signal configuration for a CSI-RS.

Figure 6:
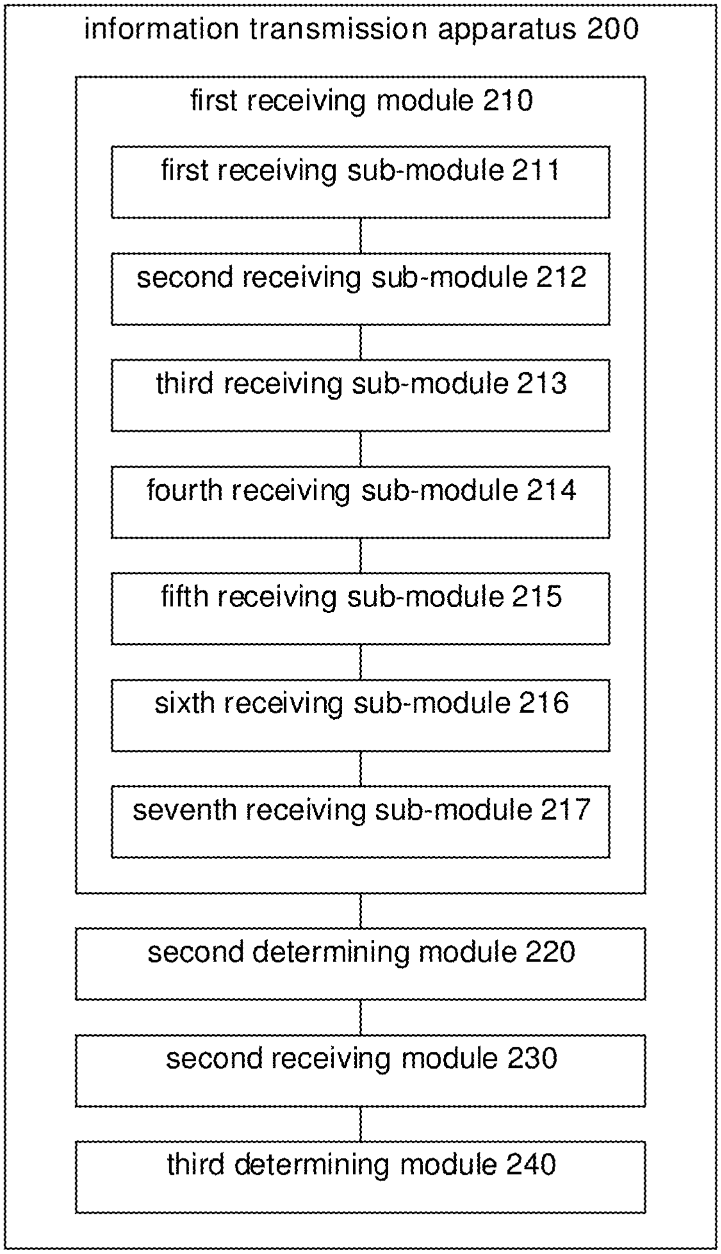
FIG. 6 is a block diagram illustrating another information transmission apparatus according to an embodiment.

Embodiments of the disclosure also provide an information transmission apparatus, applied to a UE for wireless communication. As illustrated in FIG. 6, the information transmission apparatus 200 includes: a first receiving module 210 and a second determining module 220.

The first receiving module 210 is configured to receive an availability configuration.

The second determining module 220 is configured to determine, based on the availability configuration, reference signal configuration(s) used by a UE in a non-connected state for downlink synchronization.

The UE in the non-connected state includes: an idle UE and/or an inactive UE.

In an embodiment, the availability configuration includes: a first configuration and a second configuration.

The second determining module includes one of:

a first determining sub-module, configured to, in response to receiving the first configuration, determine that the reference signal configuration(s) is/are effective; and a second determining sub-module, configured to, in response to receiving the second configuration, determine that the reference signal configuration(s) is/are ineffective.

In an embodiment, the reference signal configuration includes one of:

a physical layer resource and a QCL parameter; or the physical layer resource.

In an embodiment, the first receiving module 210 at least includes one of:

a first receiving sub-module 211, configured to receive paging DCI carrying the availability configuration; or a second receiving sub-module 212, configured to receive a PEI, in which the PEI is associated with the availability configuration.

In an embodiment, the PEI includes:

a PEI carried by DCI, in which the DCI carrying the PEI also carries the availability configuration; or a sequence-based PEI signal, in which the PEI signal is a physical layer signal, and the PEI signal is in a correspondence relation with the availability configuration.

In an embodiment, the first receiving module 210 at least includes one of:

a third receiving sub-module 213, configured to receive paging DCI for indicating the first configuration;

a fourth receiving sub-module 214, configured to receive paging DCI for indicating the second configuration;

a fifth receiving sub-module 215, configured to receive a PEI for indicating the first configuration; or a sixth receiving sub-module 216, configured to receive a PEI for indicating the second configuration.

In an embodiment, the apparatus 200 further includes one of:

a second receiving module 230, configured to, in response to there being at least two availability configurations, receive an effective indication, in which the effective indication indicates availability configurations that is/are effective among the at least two availability configurations; and a third determining module 240, configured to, in response to there being one availability configuration, determine that the availability configuration is effective by default.

In an embodiment, the first receiving module 210 includes:

a seventh receiving sub-module 217, configured to receive a SIB carrying the availability configuration.

In an embodiment, the reference signal configuration(s) include(s):

a signal configuration for a TRS and/or a signal configuration for a CSI-RS.

In an embodiment, the first sending module 110, the second sending module 120, the first determining module 130, the first receiving module 210, the second determining module 220, the second receiving module 230 and the third determining module 240, etc. may be implemented by one or more Central Processing Units (CPUs), Graphics Processing Units (GPUs), Baseband Processors (BPs), Application Specific Integrated Circuits (ASICs), Digital Signal Processors (DSPs), Programmable Logic Devices (PLDs), Complex Programmable Logic Devices (CPLDs), Field-Programmable Gate Arrays (FPGAs), general processors, controllers, Micro Controller Units (MCUs), microprocessors or other electronic components, for implementing the above methods.

Figure 7:
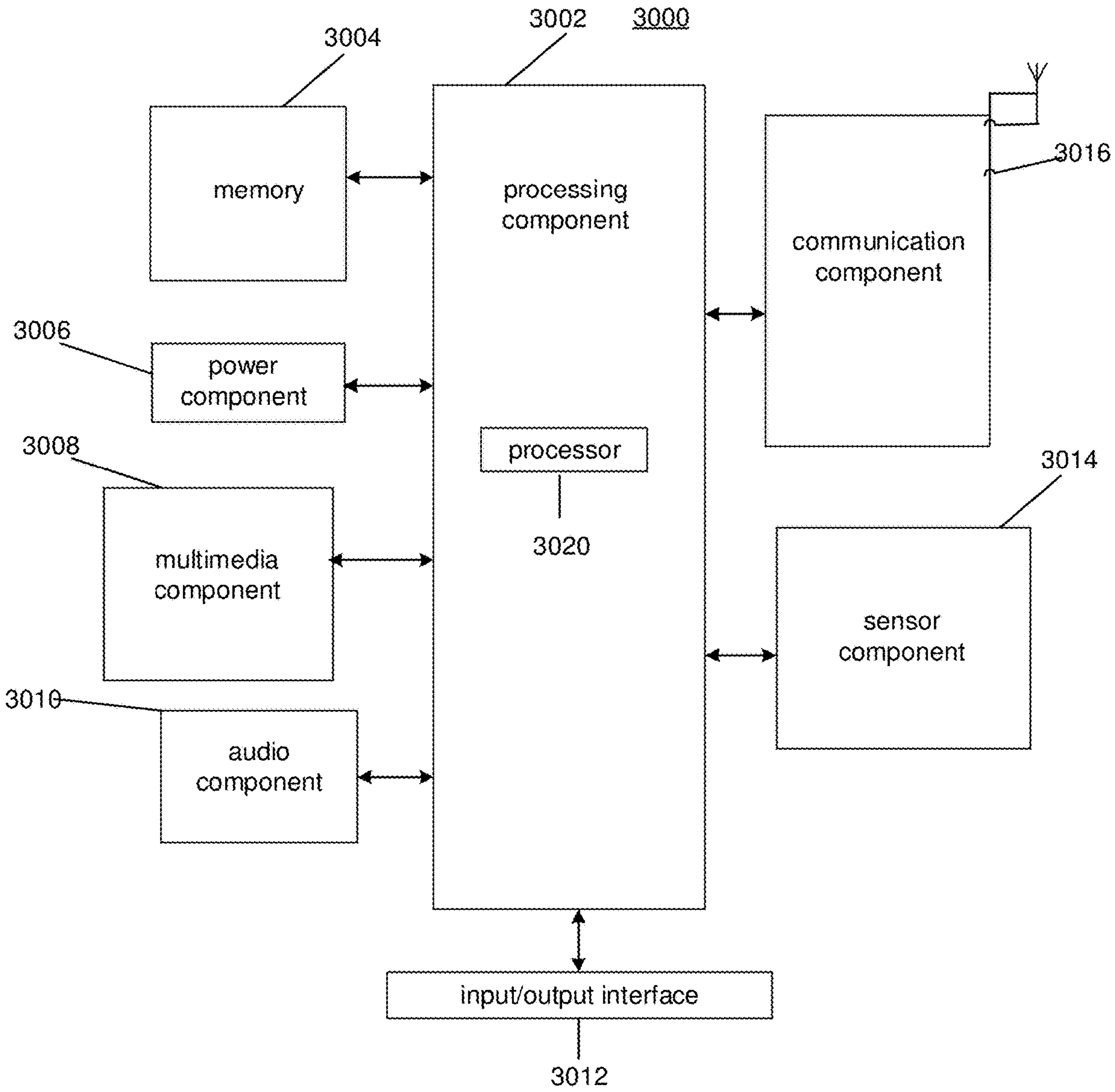
FIG. 7 is a block diagram illustrating a device for transmitting information according to an embodiment.

FIG. 7 is a block diagram illustrating a device 3000 for transmitting information according to an embodiment. For example, the device 3000 may be a mobile phone, a computer, a digital broadcasting terminal, a message transceiver device, a game console, a tablet device, a medical device, a fitness device and a personal digital assistant.

As illustrated in FIG. 7, the device 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 typically controls overall operations of the device 3000, such as the operations associated with display, telephone calls, data communications, camera operations, and recording operations. The processing component 3002 may include one or more processors 3020 to execute instructions to implement all or part of the steps in the above described method. Moreover, the processing component 3002 may include one or more modules which facilitate the interaction between the processing component 3002 and other components. For example, the processing component 3002 may include a multimedia module to facilitate the interaction between the multimedia component 3008 and the processing component 3002.

The memory 3004 is configured to store various types of data to support the operation of the device 3000. Examples of such data include instructions for any applications or methods operated on the device 3000, contact data, phonebook data, messages, pictures, video, etc. The memory 3004 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic or optical disk.

The power component 3006 provides power to various components of the device 3000. The power component 3006 may include a power management system, one or more power sources, and any other components associated with the generation, management, and distribution of power in the device 3000.

The multimedia component 3008 includes a screen providing an output interface between the device 3000 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensor may not only sense a boundary of a touch or swipe action, but also sense a period of time and a pressure associated with the touch or swipe action. In some embodiments, the multimedia component 3008 includes a front-facing camera and/or a rear-facing camera. When the device 3000 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 3010 is configured to output and/or input audio signals. For example, the audio component 3010 includes a microphone (MIC) configured to receive an external audio signal when the device 3000 is in an operation mode, such as a call mode, a recording mode, and a voice recognition mode. The received audio signal may be further stored in the memory 3004 or transmitted via the communication component 3016. In some embodiments, the audio component 3010 further includes a speaker to output audio signals.

The I/O interface 3012 provides an interface between the processing component 3002 and peripheral interface modules, such as a keyboard, a click wheel, buttons, and the like. The buttons may include, but are not limited to, a home button, a volume button, a starting button, and a locking button.

The sensor component 3014 includes one or more sensors to provide status assessments of various aspects of the device 3000. For instance, the sensor component 3014 may detect an open/closed status of the device 3000, relative positioning of components, e.g., the display and the keypad, of the device 3000, a change in position of the device 3000 or a component of the device 3000, a presence or absence of user contact with the device 3000, an orientation or an acceleration/deceleration of the device 3000, and a change in temperature of the device 3000. The sensor component 3014 may include a proximity sensor configured to detect the presence of nearby objects without any physical contact. The sensor component 3014 may also include a light sensor, such as a Complementary Metal Oxide Semiconductor (CMOS) or Charge-Coupled Device (CCD) image sensor, for use in imaging applications. In some embodiments, the sensor component 3014 may also include an accelerometer sensor, a gyroscope sensor, a magnetic sensor, a pressure sensor, or a temperature sensor.

The communication component 3016 is configured to facilitate communication, wired or wirelessly, between the device 3000 and other devices. The device 3000 can access a wireless network based on a communication standard, such as Wi-Fi, 2G or 3G, or a combination thereof. In embodiments, the communication component 3016 receives a broadcast signal or broadcast associated information from an external broadcast management system via a broadcast channel. In embodiments, the communication component 3016 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In embodiments, the device 3000 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described methods.

In embodiments, there is also provided a non-transitory computer readable storage medium including executable instructions, such as the memory 3004. The above instructions may be executed by the processor 3020 in the device 3000, for performing the above methods. For example, the non-transitory computer-readable storage medium may be a ROM, a Random Access Memory (RAM), a CD-ROM, a magnetic tape, a floppy disc, and an optical data storage device.

In the disclosure, the access network device sends the availability configuration, in which the availability configuration is configured to be used by the UE in the non-connected state for determining the reference signal configuration for the downlink synchronization. The UE in the non-connected state includes an idle UE and/or an inactive UE. In this way, by means of the availability configuration used by the UE in the non-connected state for determining the reference signal configuration for the downlink synchronization, whether the reference signal configuration is used for the synchronization is indicated based on actual needs, thereby improving the flexibility in the use of reference signal configuration.

Other embodiments of the disclosure will be apparent to those skilled in the art from consideration of the specification and practice of the disclosure disclosed here. The disclosure is intended to cover any variations, uses, or adaptations of the embodiments of the disclosure following the general principles thereof and including such departures from the disclosure as come within known or customary practice in the art. It is intended that the specification and embodiments are considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. An information transmission method, performed by an access network device, comprising:

sending an availability configuration, wherein the availability configuration is configured to be used by a user equipment (UE) in a non-connected state for determining a reference signal configuration for downlink synchronization; wherein the UE in the non-connected state comprises at least one of an idle UE or an inactive UE; and sending an effective indication in response to there being at least two availability configurations, wherein the at least two availability configurations are carried via different physical layer signaling, and the effective indication is configured to indicate an effective availability configuration among the at least two availability configurations and a physical layer signaling associated with the effective availability configuration.

2. The method of claim 1, wherein the availability configuration comprises:

a first configuration, configured to indicate that the reference signal configuration is effective; or a second configuration, configured to indicate that the reference signal configuration is ineffective.

3. The method of claim 2, wherein the reference signal configuration comprises one of:

a physical layer resource and a Quasi co-located (QCL) parameter; or a physical layer resource.

4. The method of claim 2, wherein, the availability configuration is carried by paging downlink control information (DCI); or the availability configuration is associated with a paging early indication (PEI).

5. The method of claim 4, wherein the PEI comprises:

a PEI carried by DCI, wherein the DCI carrying the PEI carries the availability configuration; or a sequence-based PEI signal, wherein the PEI signal is a physical layer signal, and the PEI signal is in a correspondence relation with the availability configuration.

6. The method of claim 2, wherein sending the availability configuration comprises one of:

sending paging downlink control information (DCI) for indicating the first configuration;

sending paging DCI for indicating the second configuration;

sending a paging early indication (PEI) for indicating the first configuration; or sending a PEI for indicating the second configuration.

7. The method of claim 1, further comprising:

determining by default that an availability configuration is effective in response to there being one availability configuration.

8. The method of claim 1, wherein sending the availability configuration comprises: sending a system information block (SIB) carrying the availability configuration.

9. The method of claim 1, wherein the reference signal configuration comprises at least one of:

a signal configuration for a tracking reference signal (TRS) or a signal configuration for a channel state information-reference signal (CSI-RS).

10. An information transmission method, performed by a user equipment (UE), comprising:

receiving an availability configuration;

receiving an effective indication in response to there being at least two availability configurations, wherein the at least two availability configurations are carried via different physical layer signaling, and the effective indication is configured to indicate an effective availability configuration among the at least two availability configurations and a physical layer signaling associated with the effective availability configuration;

determining, according to the effective indication, the effective availability configuration among the at least two availability configurations; and determining, based on the effective availability configuration, a reference signal configuration used by the UE in a non-connected state for downlink synchronization;

wherein the UE in the non-connected state comprises at least one of an idle UE or an inactive UE.

11. The method of claim 10, wherein the availability configuration comprises: a first configuration and a second configuration; and wherein determining, based on the availability configuration, the reference signal configuration used by the UE in the non-connected state for downlink synchronization comprises one of:

determining that the reference signal configuration is effective in response to receiving the first configuration; or determining that the reference signal configuration is ineffective in response to receiving the second configuration.

12. The method of claim 11, wherein the reference signal configuration comprises one of:

a physical layer resources and a Quasi co-located (QCL) parameter; or a physical layer resource.

13. The method of claim 11, wherein receiving the availability configuration comprises at least one of:

receiving paging downlink control information (DCI) carrying the availability configuration; or receiving a paging early indication (PEI), wherein the PEI is associated with the availability configuration.

14. The method of claim 13, wherein the PEI comprises:

a PEI carried by DCI, wherein the DCI carrying the PEI carries the availability configuration; or a sequence-based PEI signal, wherein the PEI signal is a physical layer signal, and the PEI signal is in a correspondence relation with the availability configuration.

15. The method of claim 11, wherein receiving the availability configuration comprises one of:

receiving paging downlink control information (DCI) for indicating the first configuration;

receiving paging DCI for indicating the second configuration;

receiving a paging early indication (PEI) for indicating the first configuration; or receiving a PEI for indicating the second configuration.

16. The method of claim 10, further comprising:

determining by default that an availability configuration is effective in response to there being one availability configuration.

17. The method of claim 10, wherein receiving the availability configuration comprises:

receiving a system information block (SIB) carrying the availability configuration.

18. The method of claim 10, wherein the reference signal configuration comprises at least one of:

a signal configuration for a tracking reference signal (TRS) or a signal configuration for a channel state information-reference signal (CSI-RS).

19. A communication device, comprising:

a processor; and a memory storing an executable program stored in the memory and executable by the processor, wherein the processor is configured to:

send an availability configuration, wherein the availability configuration is configured to be used by a user equipment (UE) in a non-connected state for determining a reference signal configuration for downlink synchronization; wherein the UE in the non-connected state comprises at least one of an idle UE or an inactive UE; and send an effective indication in response to there being at least two availability configurations, wherein the at least two availability configurations are carried via different physical layer signaling, and the effective indication is configured to indicate an effective availability configuration among the at least two availability configurations and a physical layer signaling associated with the effective availability configuration.

20. A communication device, comprising:

a processor; and a memory storing an executable program executable by the processor, wherein the processor is configured to perform the method of claim 10.

* * * * *